United States Patent
Gimpl et al.

(10) Patent No.: US 9,331,894 B2
(45) Date of Patent: May 3, 2016

(54) INFORMATION EXCHANGE IN DATA CENTER SYSTEMS

(71) Applicant: International Business Machines Corporation, Armonk, NY (US)

(72) Inventors: Brenda B. Gimpl, Rochester, MN (US); David J. Gimpl, Rochester, MN (US); Nedzad Taljanovic, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 13/906,721

(22) Filed: May 31, 2013

(65) Prior Publication Data

US 2014/0359059 A1    Dec. 4, 2014

(51) Int. Cl.
*H04L 12/24* (2006.01)
*G06F 3/01* (2006.01)
*G06F 11/00* (2006.01)
*H04L 29/08* (2006.01)
*G06F 3/06* (2006.01)

(52) U.S. Cl.
CPC ............. *H04L 41/044* (2013.01); *G06F 3/01* (2013.01); *G06F 11/00* (2013.01); *H04L 41/042* (2013.01); *G06F 3/0605* (2013.01); *G06F 3/067* (2013.01); *H04L 41/5096* (2013.01); *H04L 67/1097* (2013.01)

(58) Field of Classification Search
CPC ............ H04L 29/08072; H04L 41/042; H04L 41/044; G06F 11/00; G06F 3/01
See application file for complete search history.

(56) References Cited

U.S. PATENT DOCUMENTS

| | | | | |
|---|---|---|---|---|
| 6,941,350 B1* | 9/2005 | Frazier | ............. | G06F 15/17375 709/209 |
| 7,127,713 B2* | 10/2006 | Davis | .................. | H04L 63/0227 717/177 |
| 7,194,538 B1* | 3/2007 | Rabe et al. | ..................... | 709/224 |
| 7,246,156 B2* | 7/2007 | Ginter | ..................... | G06F 21/55 709/217 |
| 7,328,260 B1* | 2/2008 | Muthiyan | ........... | H04L 41/0681 709/220 |
| 7,403,987 B1* | 7/2008 | Marinelli | ............ | H04L 43/0817 707/999.202 |
| 7,526,527 B1* | 4/2009 | Woodruff | .......... | H04L 29/12584 709/212 |
| 7,548,545 B1* | 6/2009 | Wittenschlaeger | ... | H04L 49/254 370/400 |

(Continued)

OTHER PUBLICATIONS

Stalling, W., SNMP and SNMPv2: The Infrastructure for Network Management, IEEE Communications Magazine, Mar. 1998, pp. 37-43.*

(Continued)

*Primary Examiner* — Jimmy H Tran

(74) *Attorney, Agent, or Firm* — Mark G. Edwards; Robert Sullivan

(57) ABSTRACT

System information may be retrieved by an element manager on a device in a data center system where the element manager detects an application programming interface (API) call to the element manager from a centralized manager. The element manager establishes a two-way communication channel between the first element manager and the centralized manager according to a communications protocol. The element manager queries the centralized manager for data center system information through the two-way communication channel. The centralized manager manages a storage area network containing the device of the element manager.

20 Claims, 5 Drawing Sheets

(56) References Cited

U.S. PATENT DOCUMENTS

| | | | | |
|---|---|---|---|---|
| 7,685,261 | B1* | 3/2010 | Marinelli | H04L 43/0817 709/220 |
| 7,769,032 | B1* | 8/2010 | Ou | H04L 45/04 370/401 |
| 7,779,119 | B2* | 8/2010 | Ginter | G06F 21/55 709/219 |
| 7,860,898 | B1* | 12/2010 | Moranta et al. | 707/803 |
| 8,001,270 | B2* | 8/2011 | Ferlitsch | H04L 29/06 709/245 |
| 8,019,849 | B1* | 9/2011 | Lopilato | G06F 17/302 709/203 |
| 8,060,587 | B2 | 11/2011 | Ahmad et al. | |
| 8,069,229 | B2* | 11/2011 | Yellapragada | H04L 41/0806 370/254 |
| 8,180,872 | B1* | 5/2012 | Marinelli | H04L 43/0817 707/603 |
| 8,209,409 | B2* | 6/2012 | Mopur | G06F 11/008 709/223 |
| 8,326,794 | B1* | 12/2012 | Wood et al. | 707/600 |
| 8,554,924 | B2* | 10/2013 | Holden | G06F 13/385 709/227 |
| 8,583,876 | B2* | 11/2013 | Taguchi | G06F 3/0622 709/217 |
| 8,646,070 | B1* | 2/2014 | Patsenker | G06F 11/00 726/22 |
| 2002/0013832 | A1* | 1/2002 | Hubbard | 709/220 |
| 2003/0061322 | A1* | 3/2003 | Igarashi et al. | 709/223 |
| 2003/0154239 | A1* | 8/2003 | Davis | H04L 63/0227 709/201 |
| 2003/0154271 | A1* | 8/2003 | Baldwin et al. | 709/223 |
| 2004/0030768 | A1* | 2/2004 | Krishnamoorthy | H04L 29/06 709/223 |
| 2005/0102429 | A1* | 5/2005 | Pinhas | H04L 67/1095 709/248 |
| 2006/0013149 | A1* | 1/2006 | Jahn | H04J 14/02 370/254 |
| 2006/0095664 | A1* | 5/2006 | Wichelman et al. | 711/114 |
| 2006/0277584 | A1* | 12/2006 | Taylor | H04L 29/06027 725/112 |
| 2007/0226535 | A1* | 9/2007 | Gokhale | 714/6 |
| 2008/0040074 | A1* | 2/2008 | Simes | 702/185 |
| 2008/0165789 | A1* | 7/2008 | Ansari et al. | 370/401 |
| 2009/0157860 | A1* | 6/2009 | Wittenschlaeger | H04L 49/254 709/223 |
| 2009/0271504 | A1* | 10/2009 | Ginter | G05B 23/0213 709/220 |
| 2010/0070732 | A1* | 3/2010 | Strutt | 711/170 |
| 2010/0332473 | A1* | 12/2010 | Brodsky et al. | 707/736 |
| 2011/0022812 | A1* | 1/2011 | van der Linden et al. | 711/163 |
| 2013/0080559 | A1* | 3/2013 | Rao | H04L 67/1097 709/208 |
| 2014/0025726 | A1* | 1/2014 | Chen | H04L 67/10 709/203 |

OTHER PUBLICATIONS

Tate et al., "Introduction to Storage Area Networks and System Networking", Redbooks, International Technical Support Organization, Nov. 2012, 5th Edition, © Copyright International Business Machines Corporation 2012.

* cited by examiner

INFORMATION EXCHANGE IN DATA CENTER SYSTEMS

TECHNICAL FIELD

This disclosure relates to information exchange in a data center system. In particular, it relates to information exchange between a centralized manager and an element manager in a data center system.

BACKGROUND

An element manager is a software application that is imbedded into or installed on a data center device (or element) or console that accesses a data center device, and is used to manage the device's particular data center resource. An element manager may not be responsible for managing other devices, but the device managed by the element manager may be dependent on functions performed by other devices within a data center system. For example, a server is dependent on the capacity and health of the hard drives that it is mapped to. Collection of element information and coordination of certain element tasks and operations can be achieved through a centralized manager controlled by a human operator. The centralized manager is an integrated software tool in the data center system that coordinates activities with element managers through a command line interface. The centralized manager gathers up and correlates resource inventory of the devices and harvests information from each of the element managers to simplify operations for the human operator.

For example, a storage system, such as the IBM® Storwize® V7000, may contain a storage element manager (V7000 controller) and a storage element (disk drive) as part of a fibre channel storage area network. The storage element manager may manage the storage resources of the storage element. A centralized manager, such as IBM® Systems Director®, may control certain actions such as configuration, provisioning, logical volume assignment, and zoning for the storage element, while the element manager may control more complex functions of the storage element. In addition to performing actions on the storage element, the centralized manager may also control other elements outside the storage system, such as a fibre channel switch of the storage area network and its corresponding network element manager.

SUMMARY

In embodiments of the disclosure, a method for retrieving system information by an element manager on a device in a data center system includes the element manager detecting an application programming interface (API) call to the element manager from a centralized manager. The element manager establishes a two-way communication channel between the first element manager and the centralized manager according to a communications protocol. The element manager queries the centralized manager for data center system information through the two-way communication channel. The centralized manager manages a storage area network containing the device of the element manager.

In other embodiments of the disclosure, a system for sharing and retrieving information in a data center system includes a data center device having an element manager. The element manager has a communications protocol implementation and an information application programming interface (API) implementation. The element manager is configured to detect an application programming interface (API) call from a centralized manager. The communications protocol implementation is configured to establish a two-way communication between the element manager and the centralized manager according to a communications protocol. The information API implementation is configured to query the centralized manager for data center system information.

In other embodiments of the disclosure, a data center system for sharing data center system information includes a first device having a first element manager, a second device having a second element manager, and a centralized server having a centralized manager. The first element manager is configured to send first element information to a centralized manager. The second element manager is configured to detect an application programming interface (API) call from the centralized manager, establish a two-way communications channel between the second element manager and the centralized manager, and request data center system information from the centralized manager. The centralized manager is configured to collect the first element information from the first element manager, store the first element information, and send data center system information to the second element manager upon request from the second element manager.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

Figure 1:
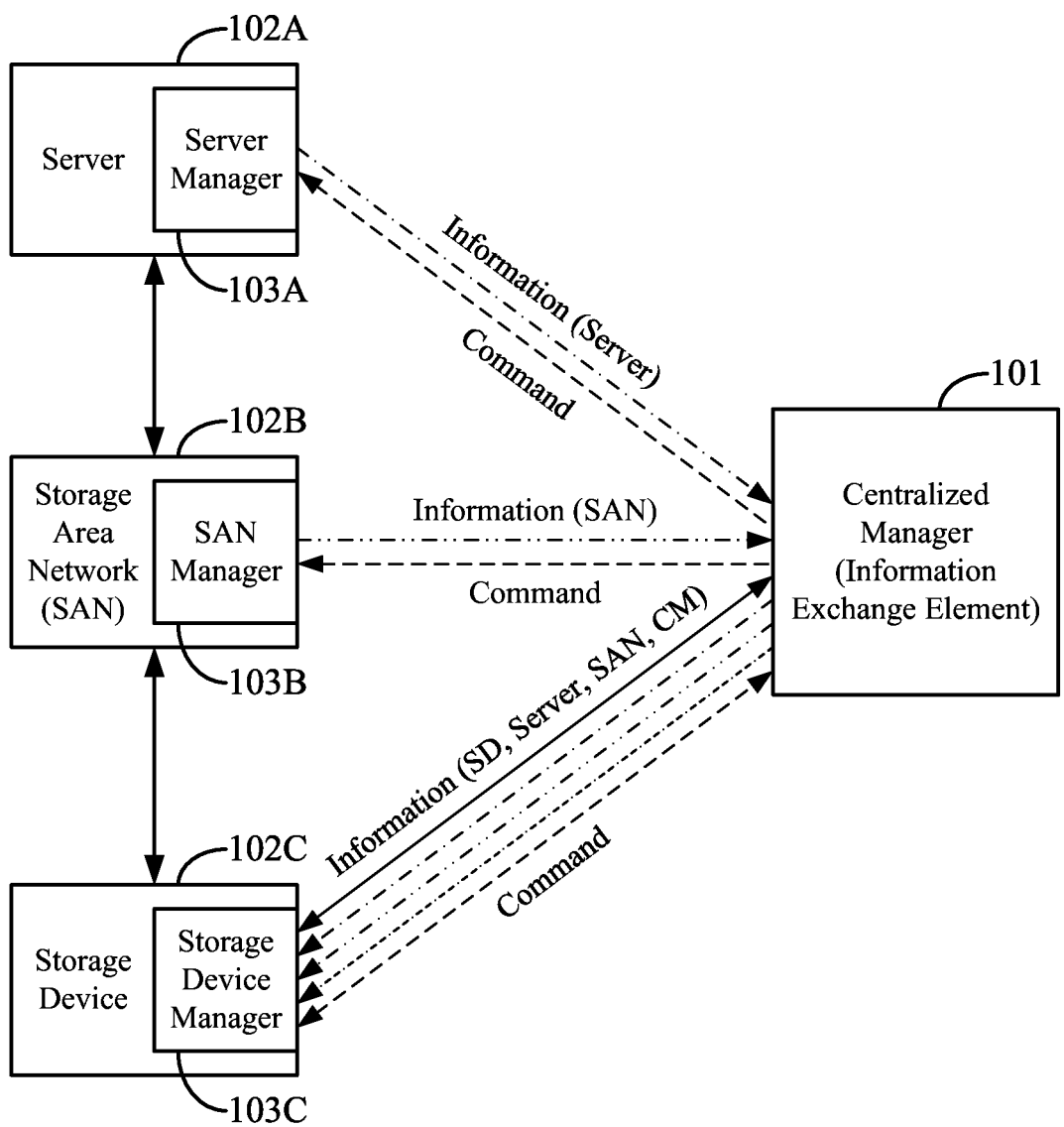
FIG. 1 is a diagram of a data center storage system that utilizes a centralized manager in two-way information exchange with a storage element manager, according to embodiments of the disclosure.

Consistent with embodiments of the present disclosure, data center resource management and representation may be improved through two-way information exchange among element managers and centralized managers in a data center system. This information exchange may occur through a centralized manager acting as an information exchange element for the elements of the data center system. The centralized manager and an element manager may have a relationship that allows the element manager to extract collected and generated system information from the centralized manager. The element manager may utilize that system information to improve its representation to human users and its management of its resource and other resources in the system.

By sharing element and centralized manager-generated information among devices in the data center system, an element manager may receive information and control its operations with less human input. A data center system with two-way communication between element managers and the centralized manager could share information without the need to contact different administrators to obtain that same information. The data center system could also automate functions that previously required human input to perform due to the information becoming decentralized to the individual element managers.

An element (device) used in the data center may have its own management and configuration software, known as an element manager. The element manager may receive commands from and send information to a centralized manager. A data center may have multiple elements and element managers which are synchronized with the centralized manager. The centralized manager retrieves information from the element managers, correlates the information from the element managers, processes the information from the element managers, and sends commands to the element managers according to information obtained from the element managers and human users. The element information flows one way from the element managers to the centralized manager and the commands and queries flow one way from the centralized manager to the element managers. This flow of commands and information may create a manager-resource relationship between the centralized manager and the element managers.

A centralized manager may communicate with an element manager through the use of an application programming interface, or API. The API is a set of programming instructions and standards used for translation of instructions and communication between the element manager of the device and the centralized manager. The API allows software on the centralized manager to communicate with a remote application of the element manager through a series of calls. For example, with the IBM® Tivoli® Storage Manager API a user can add API calls to applications, such as those that control the V7000 storage system. An API may be directly compatible with a device, so that compiled code may directly implement the API and function without additional compilation by the device, or the API may be a multi-platform standard that requires additional compilation by the device through an API implementation. The code supporting an API, also known as an API implementation, may be synchronized with or installed on an existing element manager, such as a browser plug-in, or may be part of the element manager's software.

Certain functions of the elements in a data center system may be controlled by the centralized manager, but many functions of these elements still require customization and interaction by a human operator through the elements' element managers. An element manager may have unique features that are distinguished from other element managers, and the API calls from the centralized manager cannot control all operations for elements. Due to this complexity of the features on specific devices within the data center system, the centralized managers cannot coordinate all tasks and operations without human input. The centralized managers may not be configured to perform all the tasks of individual element managers, which may include hundreds of functions; instead, the centralized manager may be configured to perform only the most commonly performed functions through the element manager. Additionally, a benefit of centralized managers is that they may simplify a user interface, a feature that may be rendered ineffective if the user interface was crowded with specific functions for every element with which the centralized manager has management capability.

One-way communication and information transfer between a centralized manager and an element manager carries costs related to human input. Often different human users will have ownership and control of different elements in a data center system. For example, in a storage system, there may be one or more server administrators for the servers, network administrators for the storage area network, and storage administrators for the virtual and real storage devices. For proper data center operations, these administrators may share information and coordinate operations, both of which require resources and are open to human error.

Overview

FIG. 1 is a diagram of a data center storage system utilizing a centralized manager 101 in two-way information exchange with a storage device manager 103C on a storage device 102C, consistent with embodiments of the disclosure. A server 102A accesses the storage device 102C through a storage area network 102B. The centralized manager 101 receives server information from the server manager 103A, receives storage area network information from the storage area network manager 103B, receives storage device information from the storage device manager 103C, and may create its own information from correlating and processing the element information.

The storage device manager 103C may detect the centralized manager 101 and establish a two-way connection with the centralized manager 101. Once the connection is established, the storage device manager 103C may query the centralized manager 101 for resource information, such as server information, storage area network information, additional information created by the centralized manager, or its own resource information, as displayed by the various lines to the storage device manager 103C. The centralized manager 101 may send the information to the storage device manager 103C, which may utilize the information to improve management or representation of its own resources in the system.

Figure 2:
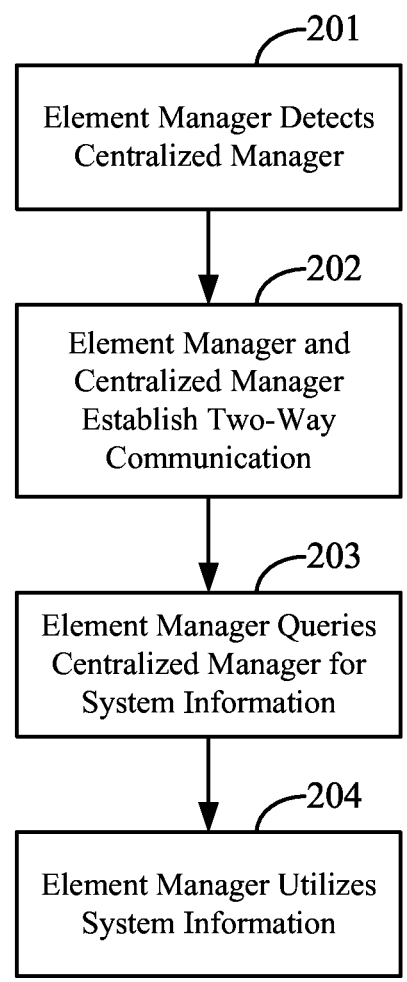
FIG. 2 is a flowchart of a method for sharing system information in a data center system, according to embodiments of the disclosure.

FIG. 2 is a flowchart of a method for sharing system information in a data center system, according to embodiments of the disclosure. An element manager is in contact with a centralized manager and detects the centralized manager, as in 201. The centralized manager may send commands through a known or identified socket and the element manager may identify the centralized manager through this socket knowledge. Once the element manager detects the centralized manager, the element manager establishes two-way communication with the centralized manager, as in 202. Establishing two-way communication may involve the centralized manager authorizing the element manager as a client and the element manager authenticating the centralized manager as a server of the client according to a communications protocol. Establishment of the element manager as a client may create an information exchange relationship between the centralized manager and the element manager and open a communication channel where information may flow from the centralized manager to the element manager upon the request of the element manager.

The element manager may query the centralized manager for data center system information, as in 203. Data center system information may include information as to how the element manager relates to other elements in the data center system, such as resource usage by clients. After receiving the data center system information, the element manager may utilize that system information to improve its resource presentation and management, as in 204.

System Components

Figure 3:
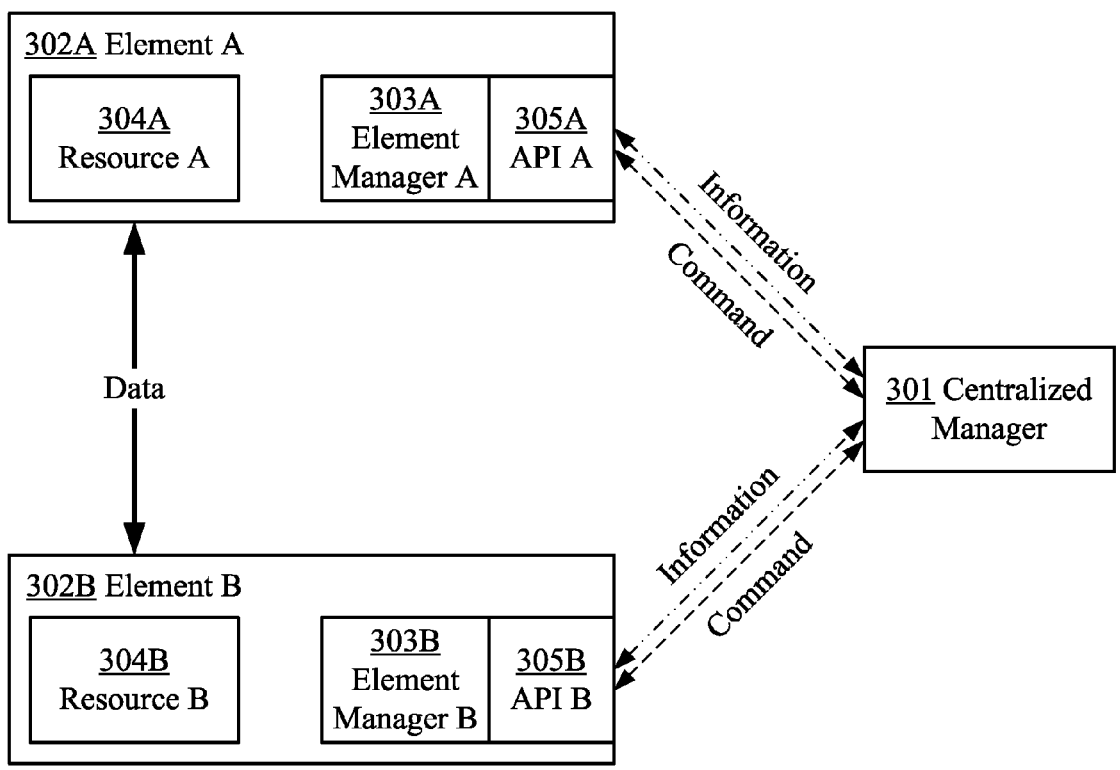
FIG. 3 is a diagram of a data center system having two elements in two-way communication with a centralized manager, according to embodiments of the disclosure.

A data center system that utilizes a centralized manager as an information exchange element may have a centralized manager in communication with element managers using a communications protocol. FIG. 3 is a diagram of a data center system having an element A 302A and an element B 302B in communication with a centralized manager 301, according to embodiments of the disclosure. Element A 302A has an element manager A 303A and API implementation A 305A installed on element A 302A. Element B 302B has an element manager B 303B and API implementation B 305B installed on element B 302B. The data center elements 302A and 302B may have a resource A 304A and resource B 304B, respectively. Element A 302A and element B 302B may be connected and transfer data to each other, either directly or through a network, such as a storage area network.

A data center element may be any device that contains a resource used in a data center system and is connected to other elements directly or through a network. A few examples of elements and their corresponding resources include a hard drive for storage, a fibrechannel switch for network control, and a server for network access. An element manager may be a software unit embedded or installed on an element in a data center system to manage the resource of the element or it may be a software unit installed on a control device that is connected to a data center element, such as a console or controller. For purposes of this specification, a console on which an element manager is installed may be considered part of the element. Examples of element managers may include a network manager such as IBM® Brocade Fabric Manager for managing a fibrechannel switch, a storage device manager such as IBM® Storage HMC for DS8000 for managing hard drives, and a server manager such as IBM® Power Systems HMC for managing a p770 Power System P® server.

Element managers may have information application programming interfaces (API) that allow the element managers to query or retrieve information from a centralized manager, in addition to receiving and complying with information requests from the centralized manager. The API's may be programmed into the element managers through API implementations to enable the element managers to engage in two-way communication with the centralized manager. Simpler API's may return information collected from and correlated with other element managers in the data center system which may resemble a client-server function. More complex API's may return system information distilled from multiple sources and system information having added value from the centralized manager's processing or correlation of the information.

A centralized manager may be a hardware or software unit that collects, correlates, or processes information from elements within a data center system and issues commands to the elements based on human and data center system input. The centralized manager may act as an aggregator, processor, and store of information from the elements of the data center. The centralized manager may be a software program installed onto a centralized control server in communication with the elements of the data center system. Examples of centralized managers may include a centralized storage manager such as IBM® Tivoli® Storage Productivity Center and a centralized system manager such as IBM® Systems Director®.

A centralized manager and element managers may communicate through a communications protocol. The communications protocol may specify the rules that govern the transmission of communications messages. The communications protocol used to communicate between the centralized manager and element manager may inform how the element managers detect the centralized manager and establish a two-way communication channel with the centralized manager. For example, IBM® Systems Director® communicates with element managers using a variety of discovery protocols when discovering system resources, the usage of which may depend on the resource type. The communications protocol may include a protocol suite such as TCP/IP. The communications protocol may be programmed into the centralized manager and element managers through communications protocol implementations.

Method—Element Manager

Figure 4:
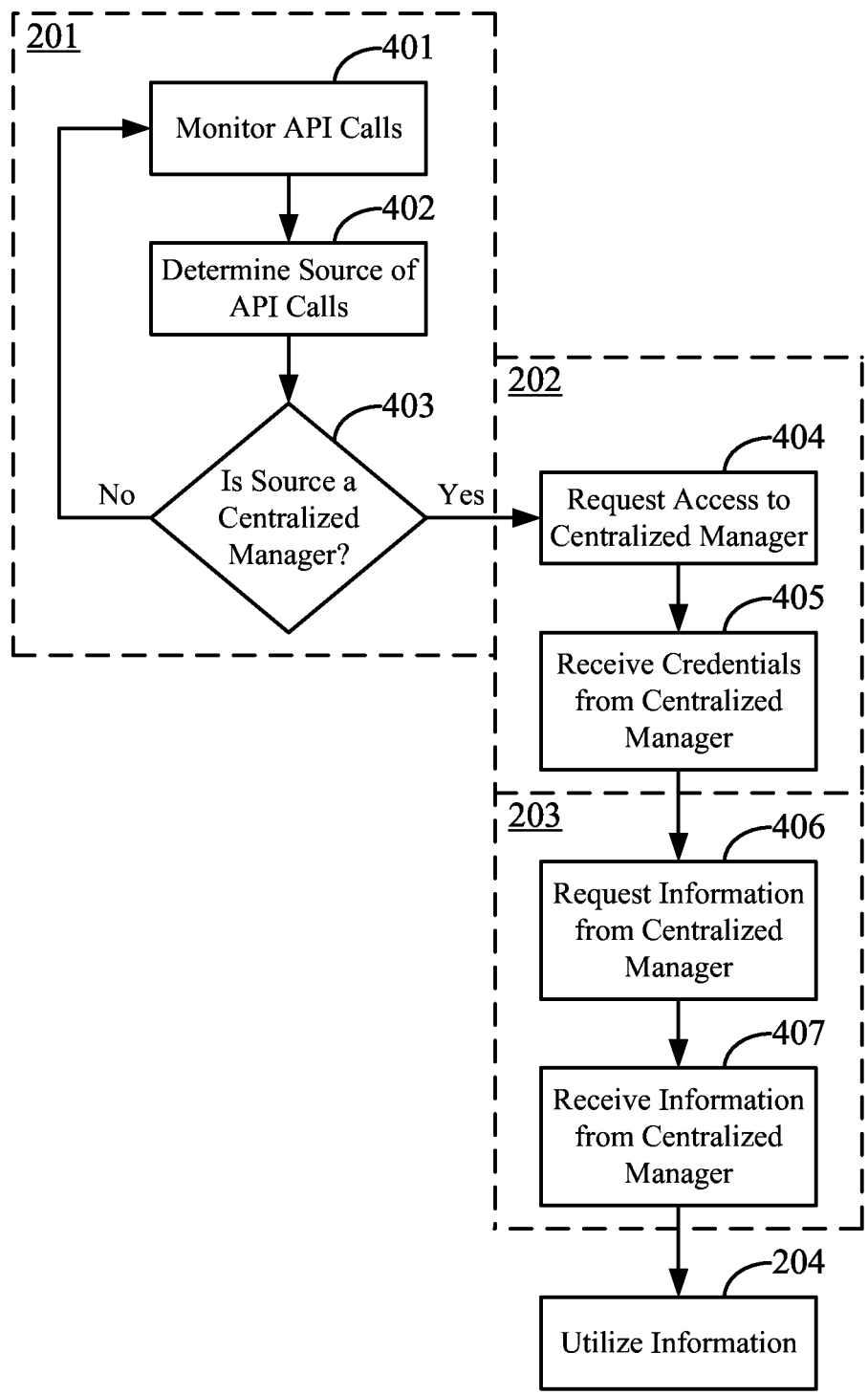
FIG. 4 is a flowchart of a method of retrieving and utilizing system information from a centralized manager in a data center system, according to embodiments of the disclosure.

FIG. 4 is a flowchart of a method of retrieving and utilizing system information from a centralized manager in a data center system, according to embodiments of the disclosure. The centralized manager, operating in its capacity as a data center system manager, collects and processes element information from the element managers of the elements in the data center system through API calls.

1. Detect Centralized Manager

An element manager may monitor its ports for API calls from external sources, as in 401. The element manager may have a socket API that allows the element manager to receive calls from external sources such as a centralized manager. An external source may access the element manager from a network socket having a socket address that includes an Internet Protocol (IP) address and a port number. The element manager determines the source of the API call, as in 402. This may be done by evaluating the IP address and port number from which the API call comes. For example, IBM Systems Director® communicates over port 8422 unless a different port is specified. The element manager evaluates whether the centralized manager is the source of the API call, as in 403. If the source of the API call is not a centralized manager, the element manager continues to monitor API calls, as in 401.

2. Establish Two-Way Communication

If the source of the API call is a centralized manager, the element manager establishes two-way communication with the centralized manager, as in 202. The method by which the element manager establishes a two-way communication channel with the centralized manager may depend on the communications protocol used between the element manager and the centralized manager. The element manager may require additional code, such as a plug-in, to initiate the two-way communication. The element manager may request access to the centralized manager, as in 404, such as by reflecting or sending back a socket bind on the port from which the centralized manager is communicating. The centralized manager may be secured and require a password, which may be supplied by the element manager. The centralized manager receives the request and, if the request is accepted, may permit the response and authenticate itself with credential information, such as by returning system version information. The element manager may receive the credential information, as in 405, to establish the two-way communication channel.

3. Query for System Information

After two-way communication is established between the element manager and the centralized manager, the element manager may query the centralized manager for data center system information, as in 202, through an API from the element manager. Some data center system information, such as the human-given names of other elements in the data center system, may be communicated automatically to the element manager from the centralized manager. The element manager may request system information from the centralized manager, as in 406. The centralized manager may send back system information which is then received by the element manager, as in 407. Data center system information may be any system information collected or processed by the centralized manager, and may include element information from elements in the data center system, centralized information correlated or created by the centralized manager, or information added by human users. For example, system information may be information about the relationship of the element to the data center such as attachment to and consumption of the element's resource by other elements.

4. Utilize System Information

An element manager may utilize the data center system information retrieved from the centralized manager, as in 204. The element manager's element may belong to a data center system that includes various elements that are related to the element manager's element, but that do not share information about these relationships without the centralized manager acting as an information exchange element. For example, a storage device may be configured to a storage area network and may be dependent on the health of the data channels of the storage area network, but may not have any information about the storage area network beyond the ports accessing it.

Due to the multitude of element configurations and relationships possible for a data center system, the information that may be utilized by the element manager may include any data center system information that relates to an element in the data center system. The following are examples of how an element manager may utilize system information from other elements in the data center system.

Example A

User Representation

Two-way communication with a centralized manager may simplify element manager control by representing to the element manager's human user the given name of other resources in the data center network. For example, a storage element manager may require the world wide port names (WWPN's) of servers to configure the storage area network that accesses its storage resource. WWPN's are 8 byte hexadecimal addresses that are used for data exchange. A server on WWPN 1 provides the centralized manager with information that WWPN 1 is one of its FC port addresses and that its name is "Server Alpha." On the centralized manager, WWPN 1 corresponds to "Server Alpha." A storage system on WWPN 2 provides the centralized manager with information that WWPN 2 is one of its FC port addresses, that its name is "Disk Beta," and that it maps to WWPN 1, which the centralized manager correlates and stores in its information bank. On the centralized manager, WWPN 2 corresponds to "Disk Beta." However, on the element manager for Disk Beta, the WWPN of the server may only be represented as WWPN 1, as the element manager lacks the information of the centralized manager to provide the name of the server. When a user accesses the storage element manager to configure the SAN, the user only sees WWPN 1 for the server, and must correlate WWPN 1 with the server in order to continue with the configuration operation.

When the storage element manager is in two-way communication with the centralized manager, it may query the centralized manager for information correlating the WWPN information of the server with the human-given server name. The centralized manager may cross-reference the WWPN's of the server accessing it, find out the human given name of the server, and auto-populate the host names and port alias names for the server. With this naming information, the graphic user interface (GUI) of the element manager may utilize the centralized manager's information and display the given name of the server, allowing easier configuration for the user.

Example B

File System Consumption and Utilization

A centralized manager may have information about the file system utilization within a storage volume, such as a hard drive. When a centralized manager is in one-way communication with a storage element manager, the storage element manager may send file utilization information to the centralized manager, such as the capacity of the hard disks. As a storage volume fills up, the centralized manager may alert a human operator to the condition. The human operator may increase the amount of storage available at the storage element manager, so as not to run out of storage for a server mapped to the storage volume. The centralized manager may not be configured to perform this operation, requiring a human operator to interact with the storage element manager. The centralized manager may have the information, but not the access; the element manager may have the access, but not the information.

When the storage element manager is in two-way communication with the centralized manager, control for increasing volume may be decentralized to the storage element manager, as the file consumption information is available to the storage element manager. The storage element manager may have auto-grow policy triggers such as volume limits, so that the storage element self-optimizes for a server without human input. The storage element manager may now have both the control of the element and the information necessary to automatically perform operations on the element.

Example C

Connectivity Overlay and Network Warning

A centralized manager may generate storage area network fabric information by monitoring the health of the data channels in a network. When a centralized manager is in one-way communication with the storage area network manager and a data channel fails, a human operator may adjust the data path ports to work around the failure.

When the network element manager is in two-way communication with the centralized manager, the network element manager may have predictive control of the network through fabric information that indicates the health of the data channels in the network. The network element manager may automatically adjust the data path ports to prepare for an upcoming failure or to adjust a current failure.

Example D

Storage Health

A centralized manager may have some management control over a pool of storage, but may not have information for both storage device health and configuration. The centralized manager may extract storage information from individual storage elements of a storage pool controlled by a controller, including the RAID level and disk protection of the storage elements. However, when the centralized manager is in one-way communication with the storage element manager and a storage device begins to fail, a human operator may not have detailed system information about the storage pool and controller, such as the human name of the controller for the storage device. Additionally, the element manager for the failing storage device may not have information about its storage pool to the extent that it can exercise control over data transfer in the event of a failure.

When the storage element manager is in two-way communication with the centralized manager, the storage element manager may request the human names of the elements in its storage pool, including the name of the controller. Additionally, the storage element manager may request the disk protection information of other storage devices in its storage pool, so that it may monitor the health of the other storage elements and prepare for failure by addition of storage to the storage pool.

Method—Centralized Manager

Figure 5:
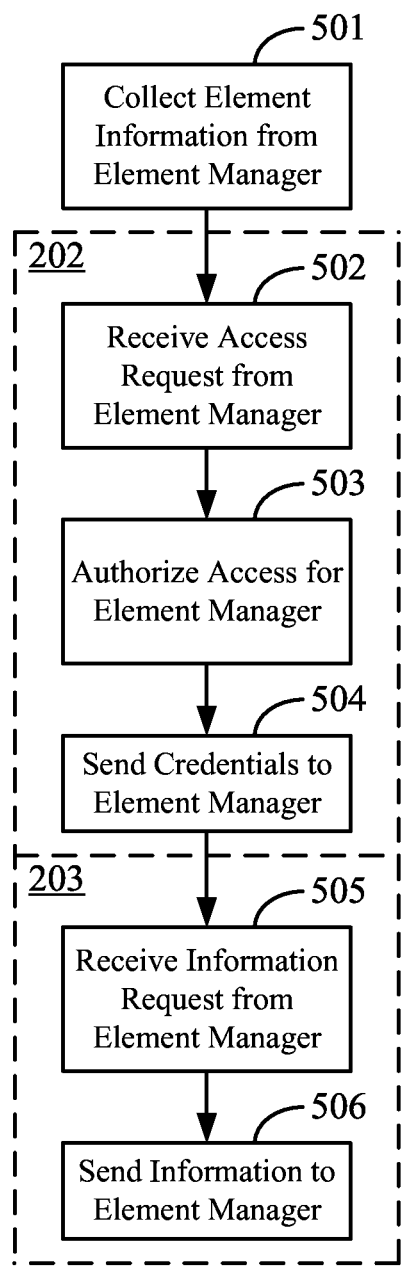
FIG. 5 is a flowchart of a method for sharing information among elements in a data center system by a centralized manager, according to embodiments of the disclosure.

FIG. 5 is a flowchart of a method for sharing information among elements in a data center system by a centralized manager, according to embodiments of the disclosure. A centralized manager collects element information from element managers, as in 501, and information from human input, and may process and correlate this information to present it on a GUI. This data center system information may vary depending on the element manager and the basic management and interfacing capabilities of the centralized manager.

The centralized manager may authorize an element manager as a client by establishing a two-way communication channel with the element manager, as in 202. The centralized manager may receive an access request from the element manager, as in 502. The centralized manager may authorize access for the element manager, as in 503. The centralized manager may require additional security input, such as a password, before allowing the element manager to access the centralized manager. If the centralized manager authorizes the element manager, it may authenticate itself, such as by sending its credentials to the element manager, as in 504. The credentials may include the version number of the centralized manager or other identifier.

Once the element manager has been established as a client with a two-way communication channel with the centralized manager, the centralized manager may begin receiving queries for data center system information from the element manager, as in 203, through API calls from the element manager. The centralized manager may receive a request for system information from the element manager, as in 505. This may be information gathered or processed by the centralized manager in 501, described above. The centralized manager may send the information to the element manager, as in 506.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but is not limited to, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium including, but not limited to, wireless, wire line, optical fiber cable, RF, etc., or any suitable combination of the foregoing.

Computer program code for carrying out operations for aspects of the present disclosure may be written in any combination of one or more programming languages, including an object-oriented language such as Java, Smalltalk, C++, or the like, and conventional procedural programming languages, such as "C" programming language or similar programming languages. The program code may execute entirely on the user's computer, partly on the user's computer, as a standalone software package, partly on the user's computer and partly on a remote computer or server, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer or other programmable apparatus provide processes for implementing the functions/acts specified in the flowchart and/or block diagram block or blocks.

The flowcharts and block diagrams in FIG. 1, FIG. 2, FIG. 3, FIG. 4, and FIG. 5 illustrate the architecture, functionality, and operation of possible implementations of systems, methods, and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Note that Storwize®, Systems Director®, and Tivoli® are trademarks of International Business Machines Corporation, registered in many jurisdictions worldwide.

What is claimed is:

1. A method comprising:
   receiving a first request for first information by a first element manager, the first element manager managing a first element in a storage area network (SAN), the storage area network including at least one storage element, at least one server element, and at least one network element, the SAN managed by a centralized manager;
   determining, by the first element, that the first request is from the centralized manager;
   sending the first information to the centralized manager in response to the first request;
   establishing a two-way communication channel between the first element manager and the centralized manager according to a communications protocol;
   sending a second request to the centralized manager by the element manager using the two-way communication channel;
   receiving, by the first element manager, second information from the centralized manager in response to the second request, at least part of the second information originating from an administrator associated with the SAN; and
   displaying, by the first element manager, the second information.

2. The method of claim 1, wherein the determining that the first request is from the centralized manager comprises:
   identifying an address of an API call; and
   determining that the address of the API call is an address used by the centralized manager to communicate with the element manager.

3. The method of claim 1, wherein the establishing the two-way communication channel comprises:
   requesting access to the centralized manager; and
   receiving credentials from the centralized manager.

4. The method of claim 1, wherein the second information includes element information collected by the centralized manager from a second element manager managing a second element in the SAN, and further includes centralized information created by the centralized manager from the element information.

5. The method of claim 1, wherein the administrator is a human administrator.

6. The method of claim 5, wherein the second information includes a name for the first element, the name assigned by the human administrator.

7. The method of claim 6, wherein the second information further includes a second name for a second element in the SAN, the second name assigned by a second human administrator associated with the SAN, the second human administrator different from the human administrator.

8. A computer system comprising:
   a memory; and
   a processor in communication with the memory, wherein the computer system is configured to perform a method comprising:
      receiving a first request for first information by a first element manager, the first element manager managing a first element in a storage area network (SAN), the storage area network including at least one storage element, at least one server element, and at least one network element, the SAN managed by a centralized manager;
      determining, by the first element, that the first request is from the centralized manager;
      sending the first information to the centralized manager in response to the first request;
      establishing a two-way communication channel between the first element manager and the centralized manager according to a communications protocol;
      sending a second request to the centralized manager by the element manager using the two-way communication channel;
      receiving, by the first element manager, second information from the centralized manager in response to the second request, at least part of the second information originating from an administrator associated with the SAN; and
      displaying, by the first element manager, the second information.

9. The computer system of claim 8, wherein the determining that the first request is from the centralized manager comprises:
   identifying an address of an API call; and
   determining that the address of the API call is an address used by the centralized manager to communicate with the element manager.

10. The computer system of claim 8, wherein the establishing the two-way communication channel comprises:
    requesting access to the centralized manager; and
    receiving credentials from the centralized manager.

11. The computer system of claim 8, wherein the second information includes element information collected by the centralized manager from a second element manager managing a second element in the SAN, and further includes centralized information created by the centralized manager from the element information.

12. The computer system of claim 8, wherein the administrator is a human administrator.

13. The computer system of claim 12, wherein the second information includes a name for the first element, the name assigned by the human administrator.

14. The computer system of claim 13, wherein the second information further includes a second name for a second element in the SAN, the second name assigned by a second human administrator associated with the SAN, the second human administrator different from the human administrator.

15. A computer program product comprising a non-transitory computer readable storage medium having program code embodied therewith, the program code executable by a computer system to perform a method comprising:
receiving a first request for first information by a first element manager, the first element manager managing a first element in a storage area network (SAN), the storage area network including at least one storage element, at least one server element, and at least one network element, the SAN managed by a centralized manager;
determining, by the first element, that the first request is from the centralized manager;
sending the first information to the centralized manager in response to the first request;
establishing a two-way communication channel between the first element manager and the centralized manager according to a communications protocol;
sending a second request to the centralized manager by the element manager using the two-way communication channel;
receiving, by the first element manager, second information from the centralized manager in response to the second request, at least part of the second information originating from an administrator associated with the SAN; and
displaying, by the first element manager, the second information.

16. The computer program product of claim 15, wherein the determining that the first request is from the centralized manager comprises:
identifying an address of an API call; and
determining that the address of the API call is an address used by the centralized manager to communicate with the element manager.

17. The computer program product of claim 15, wherein the establishing the two-way communication channel comprises:
requesting access to the centralized manager; and
receiving credentials from the centralized manager.

18. The computer program product of claim 15, wherein the second information includes element information collected by the centralized manager from a second element manager managing a second element in the SAN, and further includes centralized information created by the centralized manager from the element information.

19. The computer program product of claim 15, wherein the administrator is a human administrator.

20. The computer program product of claim 19, wherein the second information includes a name for the first element, the name assigned by the human administrator.

* * * * *